United States Patent
Hoffmann

(10) Patent No.: US 6,879,583 B2
(45) Date of Patent: Apr. 12, 2005

(54) METHOD AND APPARATUS FOR TRANSMITTING VOICE DATA OVER VARIOUS TYPES OF NETWORKS

(75) Inventor: Klaus Hoffmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 443 days.

(21) Appl. No.: 09/682,183

(22) Filed: Aug. 1, 2001

(65) Prior Publication Data

US 2002/0054586 A1 May 9, 2002

(51) Int. Cl.[7] .............................................. H04L 12/66
(52) U.S. Cl. ...................... 370/352; 370/357; 370/435
(58) Field of Search ................................. 370/352, 355, 370/356, 357, 386, 353, 354

(56) References Cited

U.S. PATENT DOCUMENTS

| 6,026,087 A | * | 2/2000 | Mirashrafi et al. ........... 370/389 |
| 6,363,065 B1 | * | 3/2002 | Thornton et al. ............ 370/352 |
| 6,389,119 B1 | * | 5/2002 | McBride .................. 379/93.01 |
| 6,600,733 B2 | * | 7/2003 | Deng ......................... 370/352 |
| 6,614,781 B1 | * | 9/2003 | Elliott et al. ................ 370/352 |

OTHER PUBLICATIONS

RFC 1890, Schulzrinne, H., "RTP Profile for Audio and Video Conferences with Minimal Control", Jan. 1996, www.ietf.org.*

* cited by examiner

Primary Examiner—Afsar Qureshi
(74) Attorney, Agent, or Firm—Bell Boyd & Lloyd LLC

(57) ABSTRACT

A method for transmitting voice data over various types of networks wherein user data are transmitted via a transmission link of a circuit-switched network and are distributed to data packets and forwarded via a packet transmission network if the user data are typical of voice transmission. If, in contrast, the user data are typical of silence intervals, no user data are forwarded via the packet transmission network. The type of connection is determined in a signaling unit.

17 Claims, 3 Drawing Sheets

METHOD AND APPARATUS FOR TRANSMITTING VOICE DATA OVER VARIOUS TYPES OF NETWORKS

BACKGROUND OF THE INVENTION

The present invention relates to a method for transmitting voice data over various types of networks in which user data are transmitted via a transmission link of a circuit-switched data transmission network. The user data transmitted via the transmission link are distributed to data packets and forwarded via a packet transmission network.

A known method is carried out in an interworking unit which connects a packet transmission network and a circuit-switched network, see Standard H.323 (02/98) "Packet Based Multimedia Communications Systems" of the ITU-T (International Telecommunication Union-Standardization Sector Telecommunication). The interworking unit is also called a gateway in the Standard.

In the packet transmission network, the data are forwarded on the basis of data packets. However, methods are also known for forwarding data packets in circuit-switched networks. The data packets have a packet header in which the address of a destination and the address of the sender are located. There is also a data packet body in which the user data are transmitted. Typical examples of packet transmission networks are networks operating in accordance with the Internet protocol, or ATM (Asynchronous Transfer Mode) networks.

During the transmission of voice data in circuit-switched networks, i.e. in networks in which a transmission link is permanently allocated to a connection for the duration of the circuit-switched connection, user data are also transmitted in silence intervals. However, these user data are redundant for understanding the conversation. From circuit-switched networks, various measures for suppressing the forwarding of user data in silence intervals are known which, however, cannot be easily transferred to packet transmission networks or to the transition between a circuit-switched network and a packet transmission network because they only relate to the better utilization of transmission channels.

It is an object of the present invention, therefore, to specify, for the transmission of voice data over various types of data transmission networks, a simple method and apparatus in which the transmission of redundant data is restricted.

SUMMARY OF THE INVENTION

Accordingly, the present invention is based on the idea that, although no complete transmission link is permanently assigned in the transmission of data packets, the transmission capacity of the packet transmission network is, nevertheless, restricted. Thus, no user data should be transmitted as data packets in silence intervals. In the method according to the present invention, therefore, in addition to the method steps initially mentioned, the user data transmitted via the transmission link are only distributed to data packets and forwarded if the user data are typical of the voice transmission. In contrast, no user data are forwarded via the packet transmission network in silence intervals.

As such, user data which have been transmitted via the transmission link will be discarded if the user data are typical of silence intervals. If, in contrast, a measure for suppressing the user data typical of silence intervals is already being used in the circuit-switched network, this measure is also retained in the packet transmission network. In this case, user data which are typical of silence intervals are not forwarded via the transmission link and also not via the packet transmission network.

In the method according to the present invention, the connection is set up by using a signaling protocol for the circuit-switched transmission of user data. The type of connection is determined by at least one signaling unit included in the connection set-up. The method for preventing the transmission of user data in silence intervals is only carried out if a voice transmission link has been set up. In many signaling protocols, there are identifiers for the type of connection. The further development makes use of this fact in order to infer the type of user data from the type of connection. This is because it is difficult to determine, by the user data alone, whether they contain voice data, fax data or computer program data.

The present invention also can be carried out in two signaling units involved in setting up the connection independently of one another. If it is a voice connection, the method according to the present invention or one of its further developments is carried out. Such an implicit procedure makes it possible to avoid additional signaling between the signaling units with respect to the performance of the method.

In a further embodiment, the data packets contain at least one bit position, the value of which indicates that further data packets are following. When a silence interval is detected, at least one data packet is transmitted which contains a different value at the position. This measure makes it possible to inform the receiver in a simple manner that the transmitting of data packets is stopped for the time being. The receiver will thus not wait for further data packets and has no cause for initiating error processing measures. If the data packets are forwarded in accordance with a real-time transmission protocol in the packet transmission network, adequate voice quality can be ensured.

An example of such a protocol is the RTP (Real Time Protocol) protocol which has been defined in the de facto standards (Request for Comment) RFC1889 and RFC1890 by the IETF (Internet Engineering Task Force). Protocols for transmitting data in real time assume that the data packets arrive within a time of, for example, less than about 250 milliseconds at the receiver. If this is not the case, the connection is considered to be disturbed. However, the transmission protocol still can be used by the further development because it is possible to check, before the termination, via the bit position whether this is a silence interval or whether the connection is actually disturbed. The significance of the bit position for detecting a silence interval also can be put into a standard or into a de facto standard at a later time.

In a further embodiment of the method, the user data are transmitted in data packets in the packet transmission network. User data transmitted via the packet transmission network are depacketized and forwarded via a transmission link of a circuit-switched data transmission network. In the data packets, the value of at least one bit position indicates that further data packets are following. Another value of the bit position indicates that a silence interval has been detected in which no user data are transmitted in data packets. As an alternative, the method according to a second aspect also can be carried out independently of the method according to the first aspect. In this case, the data packets are generated, for example, by a terminal in the packet transmission network.

In a further development of the method according to the second aspect, user data which are typical of silence intervals are transmitted via the transmission link when there is a silence interval. As an alternative, the presence of a silence interval is signaled to the circuit-switched network in another way.

In a next further development of the method according to the second aspect, the connection is set up by using a signaling protocol for the circuit-switched transmission of user data. The type of connection is determined by at least one signaling unit included in the connection set-up. The method for preventing the transmission of user data in silence intervals is carried out only when a voice transmission link has been set up. Thus, the effects mentioned in this connection with the first aspect apply. The further development also can be carried out in two signaling units involved in the connection set-up independently of one another. If there is a voice connection, the method according to the present invention or one of its further developments are carried out. Such a procedure makes it possible to avoid additional signaling between the signaling units with respect to the performance of the method.

In an embodiment relating to both aspects, the signaling protocol is the ISUP (ISDN User Part) protocol or the Q.931 protocol for subscriber signaling in the data channel or a protocol based on these protocols, respectively. The core of the ISUP protocol has been defined in the Q.763 and Q.764 standards of the ITU-T (International Telecommunication Union Telecommunication Standardization Sector). In the signaling unit, a parameter is preferably read in which the type of connection is specified directly. One such parameter is the parameter TMR (Transmission Medium Requirement) specified in the standards. According to standard Q.764, section 2.1.1.1a), there are various types of connection, e.g.:

voice connections.

3.1 kHz audio connections.

64 kBit/s unlimited connection.

64 kBit/s unlimited preferred connection, etc.

Measures for preventing the transmission of user data in silence intervals can be carried out in voice connections and 3.1 kHz audioconnections.

In a further development relating to both aspects, the bit position in the data packets is a so-called marker bit M according to the transmission protocol RTP. Although the marker bit is provided in the de facto standard RFC1889/1890, it does not have any function. Thus, this bit can be used for measures for preventing the transmission of user data in silence intervals. All other specifications of the RFC1889/1890 standard can be retained unchanged so that the error-free interworking of units from various manufacturers is ensured.

In a next further development, the measures relating to silence intervals are carried out as a function of a message from the signaling unit to at least one interworking unit between transmission link and transmission network. Thus, it is not necessary to check the type of user data in the interworking units themselves. For signaling, a protocol is used which is suitable for driving interworking units, e.g. the MGCP (Media Gateway Control Protocol) protocol which is specified by the IETF in the de facto standard RCF2705. The transmission medium used is, for example, the Internet. In another further development, a silence interval is detected if no user data typical of voice transmission are transmitted for at least milliseconds. Known silence interval detectors can be used for detecting a silence interval. A simple method consists in converting the user data into voice signals with the aid of a code; for example, with the aid of the code according to the G.711 standard or according to the G.723.1 standard of the ITU-T (International Telecommunication Union-Telecommunication Standardization Sector). If the signals remain below a threshold value for more than milliseconds, it is assumed that this is a silence interval. The associated user data are thus not forwarded.

In yet another development of the present invention, the data packets are forwarded in accordance with the Internet protocol on the Internet and/or on an intranet. In one further development, the transmission link is a timeslot on a PCM (Pulse Code Modulation) link.

The present invention also relates to a signaling unit, particularly a switching center, which is used for carrying out the method of the present invention. The technical effects mentioned above for the method also apply to the signaling unit.

In a further development, the signaling unit or the interworking unit initiates measures by which no data packets can be transmitted in silence intervals. In this method, the interworking unit is informed at the boundary between the two networks in the case of a transition between a circuit-switched network and a packet transmission network. If there are a number of network gateways, a number of interworking units are informed.

In another embodiment, the signaling unit is configured in such a manner that, when it is operated, a method according to one of the two aspects of the method according to the present invention or their further development is carried out. If there are two interworking units which are included in the transmission of user data, they can be included from one switching center or also from separate switching centers.

The present invention also relates to interworking units which are used for transmitting voice data via various types of networks. In the interworking units, one of the methods according to the present invention or a further development of a method according to the present invention is carried out. Thus, the abovementioned technical effects also apply to the interworking units. In particular, in further developments, the interworking units are controlled by a signaling unit and/or the bit position in the data packets is occupied by a value which announces the transmission of subsequent data packets, or by a value which signals a silence interval. The value of this bit position is evaluated in the other interworking unit.

The present invention also relates to a program, the execution of which results in one of the methods according to the present invention or their further developments being carried out. The program is stored, for example, in a storage unit or on a compact disc. The program also can be transmitted in a data network message via the Internet.

Additional features and advantages of the present invention are described in, and will be apparent from, the following Detailed Description of the Invention and the Figures.

DETAILED DESCRIPTION

Figure 1:
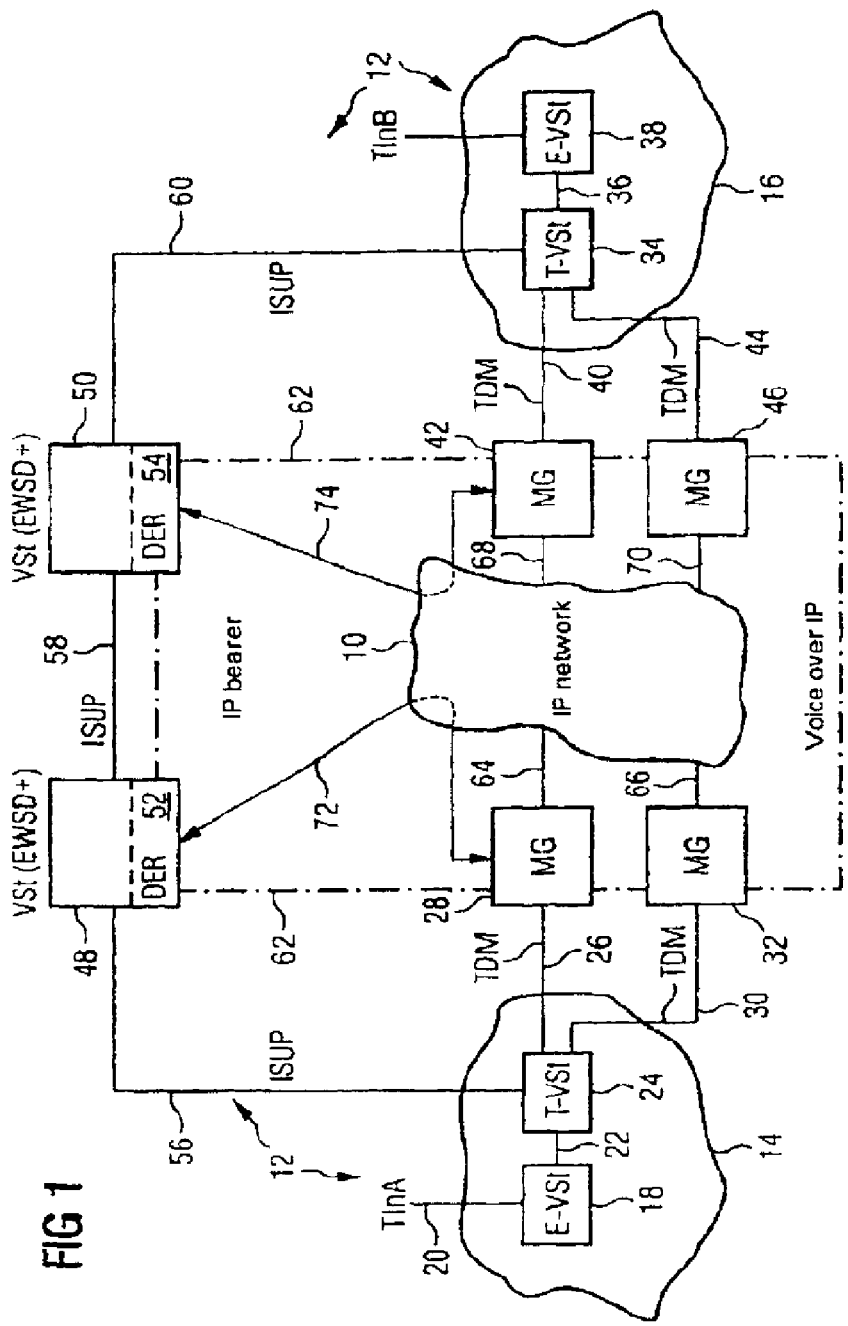
FIG. 1 shows a telecommunication network connected to the Internet.

FIG. 1 shows a telephone network 12, for example the telephone network of Telecom AG, which is connected to the Internet 10. FIG. 1 shows two parts 14 and 16 of the telephone network 12. Part 14 is located, for example, in Southern Germany and part 16 in Northern Germany. In part 14, a terminal exchange 18 is shown to which a subscriber T1nA is connected via a transmission line 20; e.g., via an ISDN (Integrated Services Digital Network) connection. The terminal exchange 18 is connected to a transit exchange 24 via an interoffice trunk 22. The transit exchange 24 is, for example, a conventional exchange of the EWSD (digital electronic switching system) type of the Siemens AG company. A transmission link 26 leads from the transit exchange 24 to an interworking unit 28. The transmission link 26 is, for example, a channel of a PCM (Pulse Code Modulation) system which is otherwise used for transmitting voice data between various exchanges. The connections between various exchanges are also called trunks.

A transmission link leads from the transit exchange 24 to another interworking unit 32. The function of the interworking units 28 and 32 will be explained below.

Part 16 of the telephone network 12 contains a transit exchange 34; e.g., of the EWSD type. The transit exchange 34 is connected via an interoffice trunk 36 to a terminal exchange 38 to which a subscriber T1nB is connected. A transmission link 40 of the transit exchange 34 leads to an interworking unit 42. A further transmission link 44 leads from the transit exchange 34 to an interworking unit 46. The transmission links 40 and 44 are, for example, PCM channels such as are normally used for transmitting voice data between exchanges. The operation of the interworking units 42 and 46 will be explained below.

The telephone network 12 also contains two exchanges 48 and 50 which are further developments of the exchanges of the EWSD type. In addition to the functions of an exchange of the EWSD type, the exchanges 48 and 50 also take over the functions of service-providing computers 52 and 54. These additional functions are below with reference to FIG. 2. Between the exchange 48 and the transit exchange 24, a signaling link 56 can be set up on which the signaling messages are transmitted in accordance with the ISUP (ISDN User Part) protocol. Examples of messages of this protocol will be explained below with reference to FIG. 1 as well.

Between the exchanges 48 and 50, a signaling link 58 can be set up. The signaling messages over this signaling link are also transmitted in accordance with the ISUP protocol.

Information elements are transmitted in a container according to the Q.765 (1998) standard. Between the exchange 50 and the transit exchange 34, a signaling link 60 can be set up on which signaling messages are transmitted according to the ISUP protocol.

Both the telephone network 12 and the Internet 10 are used for transmitting voice data between subscriber T1nA and subscriber T1nB. The voice data are transmitted circuit-switched in voice channels in the telephone network 12. In the Internet 10, in contrast, the voice data are transmitted in data packets. The boundary between the telephone network 12 and the internet 10 is indicated by a dashed line 62.

In the interworking units 28, 32, 42 and 46, voice data which are, in each case, received in voice channels are divided to data packets and forwarded into the Internet 10. Data packets with voice data coming from the Internet 10 are depacketized in the interworking units 28, 32, 42 and 46 and forwarded into the telephone network 12 in voice channels. The voice data are coded according to the G.711 standard on the transmission links 26, 30, 40 and 44.

The interworking units 28, 32, 42 and 46 are connected to the Internet 10 in this order via transmission links 64 to 70 so that data packets can be exchanged between interworking units 28, 32, 42 and 46 via the Internet 10. The service-providing computers 52 and 54 are also connected to the Internet 10. Thus, data packets also can be exchanged between the service-providing computers 52 and 54, respectively, and the interworking units 28, 32, 42 and 46, see signaling path 72 and 74, respectively, between the service-providing computer 52 and the interworking unit 28 and between the service-providing computer 54 and the interworking unit 42, respectively. The interworking units 28, 32, 42 and 46 and the service-providing computers 52 and 54 have, in each case, at least one Internet address at which they can be reached in the Internet 10.

Figure 2:
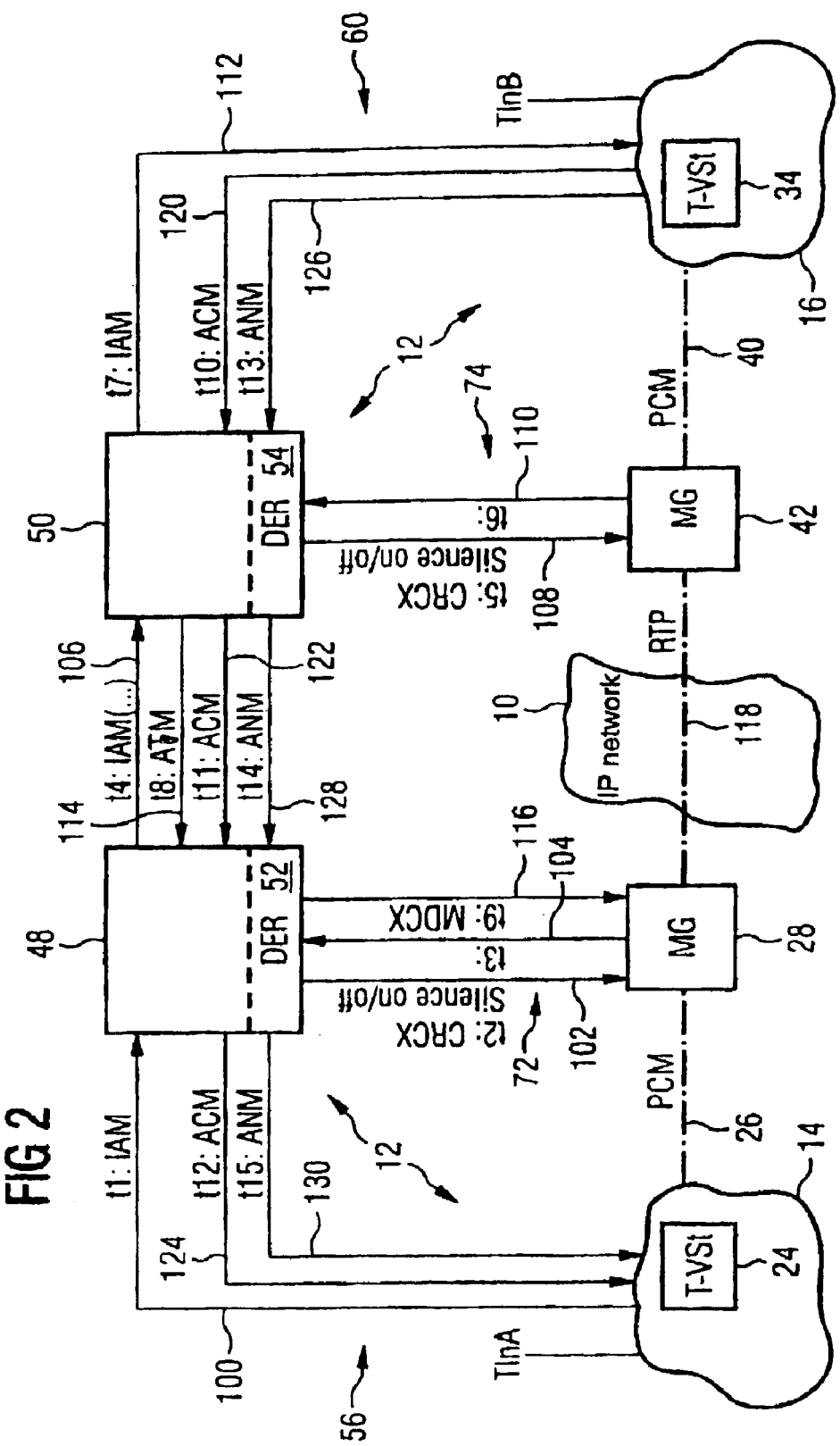
FIG. 2 shows signaling messages exchanged in the connected networks.

FIG. 2 shows signaling messages for setting up a connection between subscriber T1nA and subscriber T1nB. Functional units explained with reference to FIG. 1 have the same reference symbols in FIG. 2. When a call connection is set up between subscriber T1nA and subscriber T1nB, the transit exchange 24 generates, according to protocol, a connection set-up message 100, also called IAM (Initial Address Message) message at a time t1.

Among other things, this message contains the complete telephone number of the subscriber T1nB in the telephone network 12 and the number of a time slot to be used for transmission on the transmission link 26. The connection setup message 100 is transmitted via the signaling link 56. After the connection setup message 100 has been received, a program is executed in the exchange 48, which determines that the Internet 10 can be used for the transmission of the voice data. It is determined that the interworking unit 28 must be utilized as interface between telephone network 12 and Internet 10 on the side of the subscriber T1nA. A control unit of the exchange 48 causes the service-providing computer 52 to execute the steps necessary for this.

At a time t2 after the time t1, the service-providing computer 52 sends a connection setup message 102 according to the de facto standard RFC2705 to the interworking unit 28 via the signaling path 72. The connection setup message 102 is also called CRCX (Create Connection) message. In the connection setup message 102, the time slot is specified which is to be used for the user data transmission. In addition, the CRCX message contains information on whether a voice connection is affected and whether measures for preventing the transmission of data packets in silence intervals must therefore be made. To transmit this information, a bit is used which is called the "Silence On/Off" bit in the RFC2705 standard. According to the standard, this bit indicates whether silence interval suppression is to be carried out or not.

The interworking unit 28 processes the connection setup message 102 and, as a response, generates a response message 104 at a time t3. The response message 104 confirms reception of the connection setup message 102, on the one hand, and contains, among other things, an Internet address and a port number which can be used for receiving user data for an RTP connection to be set up between the interworking unit 28 and the interworking unit 42 and which is now allocated to the time slot.

The service-providing computer 52 receives the response message 104 and forwards the received Internet address and port number to the control unit of the exchange 48. The control unit of the exchange 48 processes the connection setup message 100 in accordance with the ISUP protocol and generates a connection setup message 106 at a time t4. The connection setup message 106 is also called an IAM message according to ISUP protocol. The connection setup message 106 contains information elements in which the Internet address and the port number are forwarded. These information elements are not specified in the ISUP standard but are transmitted via the signaling link 58 adhering to the ISUP standard. This is also called tunneling.

The exchange 50 receives the connection setup message 106 and also processes the information elements contained in it. On the basis of the content of these information elements or via the circuit identification code (CIC), it is recognized that it is not a usual telephone connection but a telephone connection using the Internet 10 which is to be set up. The exchange 50 determines that it is the interworking unit 42 which is to be the interworking unit to be used on the side of the subscriber T1nB. In addition, the exchange 50 determines a time slot which will have to 10 be used if the user data transmission between exchanges 50 and 34 is exclusively circuit-switched. This time slot designates a transmission channel of the transmission link 40. The control unit of the exchange 50 causes the service-providing computer 54 to set up an Internet connection via the signaling path 74. At a time t5, the service-providing-computer 54 sends a connection setup message 108 to the interworking unit 42. The connection setup message 108 corresponds to the aforementioned de facto standard RFC 2705 and is also called a CRCX (Create Connection) message. The message 108 contains the Internet address sent by the interworking unit 28 via the exchange 48, and the port number which are to be used for the RTP connection to be set up. In addition, the time slot determined by the exchange 50 is specified in the connection setup message 108.

The connection setup message 108 contains the bit position "Silence On/Off". A predetermined value in the bit position signals that the interworking unit 42 is to take measures for preventing the transmission of data packets in the Internet 10 in a case of silence intervals.

During the processing of the connection setup message 108 in the interworking unit 42, an Internet address and an as yet unoccupied port number of the interworking unit 42, which can be used for the reception of the user data packets by the interworking unit 28, are determined for the specified time slot.

The interworking unit 42 then sends a response message 110 at time t6 in order to confirm the reception of the connection setup message 108. The response message 110 also contains the Internet address of the interworking unit 42 determined and the port number determined.

The remaining part of the connection setup message 106 is processed in accordance with the ISUP protocol in the exchange 50. During this process, a connection setup message 112 is generated which is 10 transmitted to the transit exchange 34 via the signaling link 60. The connection setup message 112 is also called an IAM (Initial Address Message) message. The connection setup message 112 contains, among other things, the call number of the subscriber T1nB and the time slot predetermined by the exchange 50. In the transit exchange 34, the connection setup message 112 is processed according to protocol and forwarded to the terminal exchange 38. The terminal exchange 38 calls the terminal of the subscriber T1nB.

During the processing of the connection setup message 106, after the reception of the response message 110, a response message 114 which is also called an ATM (Application Transport Message) message in accordance with the ISUP protocol, is generated in the exchange 50. The response message 115 contains an information element with the Internet address of the interworking unit 42 and an information element with the port number transmitted by the interworking unit 42. The response message 114 is transmitted to the exchange 48 at a time t8.

The control unit of the exchange 48 extracts the Internet address and the port number from the response message 114 and causes the service-providing computer 52 to forward these connection parameters to the interworking unit 28. For this purpose, the service-providing computer 52 sends a modification message 116 according to de facto standard RFC 2705 at a time t9. The modification message 116 is also called an MDCX (Modify Connection) message. The modification message 116 contains the Internet address of the interworking unit 42 and the port number of the interworking unit 42, which is to be used for the RTP connection to be set up.

The modification message 116 is processed in the interworking unit 28 and a direct transmission path 118 can be used for transmitting user data between the interworking units 28 and 42 in accordance with the RTP 10 protocol. A response message to the modification message 116, generated by the interworking unit 28, is not shown in FIG. 2.

At a subsequent time t10, the transit exchange 34 generates, according to protocol, a message 120 which is also called an ACM (Address Complete Message) message and signals that all dialing digits have been transmitted in order to connect subscriber T1nA and subscriber T1nB. The message 120 is processed by the control unit of exchange 50 in accordance with protocol. At a time t11, the exchange 50 sends an ACM message 122 to the exchange 48 according to the ISUP protocol. The exchange 48 processes the ACM message 122 and, in turn, sends an ACM message 124 to the transit exchange 24.

If the subscriber T1nB accepts a call, it will be signaled to the transit exchange 34 in accordance with the ISUP protocol. At a time t13, the transit exchange 34 generates a response message 126 which is transmitted to the exchange 50 via the signaling link 60. The response message 126 is also called an ANM (Answer Message) message. On the basis of this message, for example, the call begins to be chargeable.

The response message 126 is processed in the exchange 50 in accordance with the protocol. During this process, a response message 128 is sent to the exchange 48. The exchange 48 generates a response message 130 to the transit exchange 24 at a time t15 on the basis of the response message 128.

The voice data generated by the subscriber T1nA are transmitted in time slots in part 14 of the telephone network 12 and via the transmission link 26. Between the interworking units 28 and 42, the voice data are transmitted in data packets according to the RTP protocol. On the transmission link 40 and in part 16 of the telephone network 12, the voice data are again transmitted in time slots. The processes in the interworking units 28 and 42 will be explained in 10 greater detail below with reference to FIG. 3.

The method explained with reference to FIG. 2 is used, for example, when other transmission links of the telephone network 12 are used to full capacity and/or when the use of the Internet 10 brings cost advantages for the operator of the exchanges 48 and 50 and, thus, for the subscriber T1nA as well.

Figure 3:
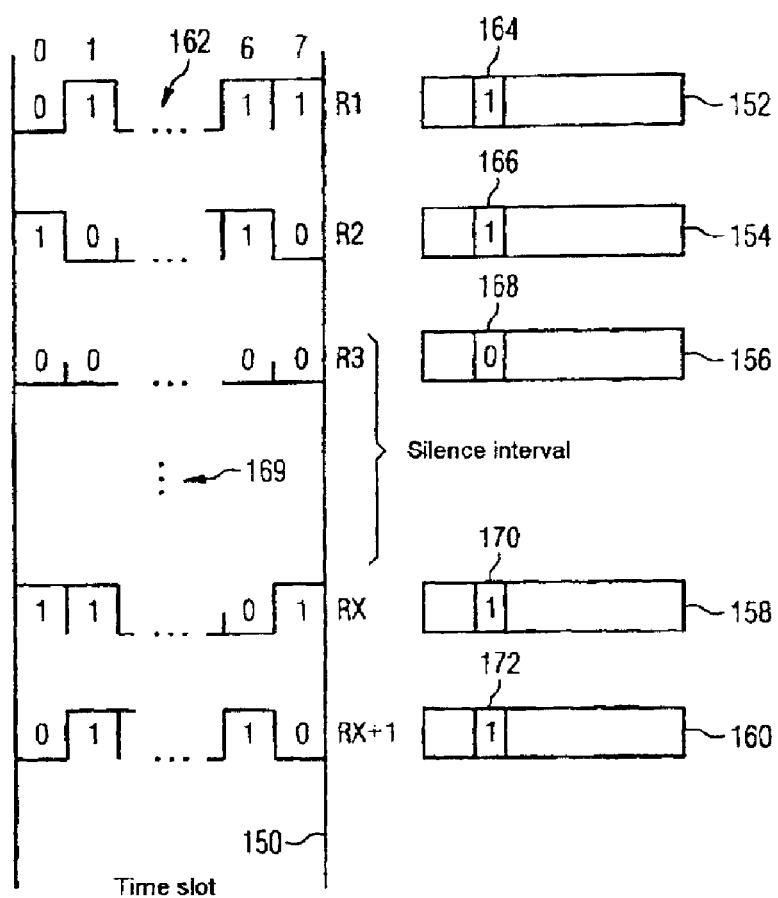
FIG. 3 shows the transmission of data packets with voice data and the discarding of user data in a silence interval.

FIG. 3 shows the steps carried outer in the interworking unit 28 and in the interworking unit 40, respectively, during the conversion of user data from a transmission channel 150 of the transmission link 26 and 40, respectively, into data packets 152 to 160. Time frames R1 to RX+1 are successively transmitted via the transmission link 26 and 40, respectively. Bit positions 0 to 7 designate bits of the data words transmitted in the transmission channel 150.

In time frame R1, a data word which contains the value 0 at bit position zero is transmitted in transmission channel 150. At bit position 1, the value one is transmitted. Bit positions 6 and 7, in each case/ have the value one. Points 162 indicate bit positions between bit positions 1 and 6. The interworking unit 28 evaluates these user data and finds out that these are voice data. For this reason, the data word transmitted in time frame R1 of the transmission 150 is transmitted in the packet body of the data packet 152. In the packet header of the data packet 152, a marker bit 164 is occupied by the value one in order to indicate that further data packets are following.

In a subsequent time frame R2, a data word which contains voice data is also transmitted. For this reason, this data word is transmitted in the packet body of the subsequent data packet 154. A marker bit 166 of the data packet 154 has the value one in order to indicate that further data packets are following.

In a time frame R3, a data word with bit values of zero indicate that now no voice data are transmitted but rather data which are produced in a silence interval. The interworking unit 28 detects this silence interval and transmits the data packet 154 in which the marker bit 168 has the value zero. The value zero indicates that, for the time being, no further data packets will be transmitted. For a relatively long time, e.g. 300 ms, only time frames R4 to RX−1 are received, the user data of which were produced in silence intervals. These time frames are indicated by dots 169. The interworking unit 28 evaluates these user data, associates them with the silence interval and discards them. As a consequence, the data words of time frames R4 to RX−1 are not forwarded in data packets via the Internet 10.

It is only in a time frame RX that a data word is again transmitted which contains voice data. The interworking unit 28 finds out that voice data are transmitted when it checks the user data. For this reason, the data word transmitted in the transmission channel 150 of the time frame RX is transmitted via the Internet 10 in the packet body of the data packet 158. A marker bit 170 of the data packet 158 again has the value one.

In the subsequent time frame RX+1, further voice data are transmitted in the transmission channel 150. For this reason, these voice data are taken from the transmission channel 150 and packetized in the data packet 160. A marker bit 172 of the data packet 160 has the value one.

The data packets 152 to 160 are received in the interworking unit 42. The values of the marker bits 164 to 168 and 170 to 172, respectively, indicate that further data packets must follow, according to the RTP protocol. After the data packet 156 has arrived, the value of zero in the marker bit 168 indicates the silence interval. During this silence interval, the interworking unit 42 does not receive any data packets of the connection explained in FIG. 3. However, user data which are typical of silence intervals are transmitted to the exchange 34 in a transmission channel.

The method steps explained with reference to FIG. 3 will only be carried out if the transmission of voice data has been signaled in CRCX messages with the aid of the bit position "Silence On/Off" by the exchanges 48 and 50, respectively. Otherwise, all incoming user data are packetized in data packets and forwarded via the Internet 10.

In another exemplary embodiment, both interworking units 28 and 42 are controlled from one exchange, for example from exchange 48 or exchange 50.

In another exemplary embodiment, the interworking units 28 and 42 are contained directly in one or two exchanges. In this case, a protocol internal to the exchange can be used for controlling the interworking units 28 and 42.

Although the present invention has been described with reference to specific embodiments, those of skill in the art will recognize that changes may be made thereto without departing from the spirit and scope of the invention as set forth in the hereafter appended claims.

What is claimed is:

1. A method for transmitting voice data, the method comprising the steps of:

setting up a connection by using a signaling protocol for circuit-switched transmission of user data from a circuit-switched network to a packet transmission network;

transmitting the user data via a transmission link of the circuit-switched network to the packet transmission network;

distributing the user data to data packets;

forwarding the user data via a packet transmission network if the user data are typical of voice transmission;

forwarding no user data via the packet transmission network if the user data are typical of silence intervals, wherein user data that is redundant between the circuit-switched network and the packet transmission network is not transmitted;

determining, via at least one signaling unit included in the connection set up, the type of connection; and checking for silence intervals only if a voice transmission link has been set up between the circuit-switched network and the packet transmission network.

2. A method for transmitting voice data over various types of networks as claimed in claim 1, the method further comprising the steps of:

indicating, in the data packets and via a value of at least one bit position, that further data packets are following; and transmitting at least one data packet which contains a different value at the bit position if a silence interval is detected.

3. A method for transmitting voice data over various types of networks as claimed in claim 2, wherein the bit position is a marker bit according to an RTP transmission protocol.

4. A method for transmitting voice data over various types of networks as claimed in claim 1, wherein the type of connection is determined in at least two signaling units involved in the connection set up independently of one another, and no signaling with respect to the type of connection is carried out between the signaling unit.

5. A method for transmitting voice data over various types of networks as claimed in claim 1, wherein the signaling protocol is one of the ISUP protocol or the Q.931 protocol, and a parameter in which the type of connection is specific is read in the signaling unit for determining the type of connection.

6. A method for transmitting voice data over various types of networks as claimed in claim 1, wherein the check for silence intervals is carried out as a function of a message of the signaling unit to at least one interworking unit which is connected between the transmission link and the packet transmission network.

7. A method for transmitting voice data over various types of networks as claimed in claim 1, wherein a silence interval is detected when no user data typical of voice transmission are transmitted for at least 20 milliseconds.

8. A method for transmitting voice data over various types of networks as claimed in claim 1, wherein the data packets are transmitted according to the internet protocol.

9. A method for transmitting voice data over various types of networks as claimed in claim 1, wherein the transmission link is formed by a time slot.

10. A method for transmitting voice data over various types of networks as claimed in claim 1, wherein the user data are coded in accordance with a G.711 standard.

11. A method for receiving voice data, the method comprising the steps of:
   receiving user data from a circuit-switched network in data packets in a packet transmission network;
   depacketizing the user data;
   forwarding the user data via a transmission link of the circuit-switched data transmission network;
   indicating, in the data packets and via a value of at least one bit position, that further data packets are following; and
   indicating, via a different value of the bit position, that a silence interval is detected, wherein user data that is redundant between the circuit-switched network and the packet transmission network is not transmitted.

12. A method for transmitting voice data over various types of networks as claimed in claim 11, wherein, when a silence interval is present, an event occurs which is one of transmitting user data which are typical of silence intervals via the transmission link, and signaling the presence of a silence interval to the circuit-switched data transmission network in a different way.

13. A method for transmitting voice data over various types of networks as claimed in claim 11, wherein a connection is set up by using a signaling protocol for the circuit-switched transmission of the user data, at least one signaling unit included in the connection setup determines the type of connection, and the check for silence intervals is only performed when a voice transmission link has been set up.

14. An interworking unit, comprising:
   a conversion unit which processes user data, transmitted via a transmission link of a circuit-switched data transmission network, to data packets and forwards the data packets via a packet transmission network during normal voice transmission; and
   a control unit which does not forward any user data via the packet transmission network when the user data is affiliated with silence intervals.

15. An interworking unit for transmitting voice data, comprising:
   a conversion unit which depacketizes data packets with user data, transmitted via a packet transmission network, and forwards the user data via a transmission link of a circuit-switched data transmission network; and
   a control unit which determines as a function of the value of a bit position in the data packets that a silence interval is detected in which no data packets are transmitted.

16. A program with an instruction sequence, upon execution of the instruction sequence by a processor a method is carried out which includes the steps of:
   setting up a connection by using a signaling protocol for circuit-switched transmission of user data from a circuit-switched network to a packet transmission network;
   transmitting the user data via a transmission link of the circuit-switched network to the packet transmission network;
   distributing the user data to data packets;
   forwarding the user data via a packet transmission network if the user data are typical of voice transmission;
   forwarding no user data via the packet transmission network if the user data are typical of silence intervals, wherein user data that is redundant between the circuit-switched network and the packet transmission network is not transmitted;
   determining, via at least one signaling unit included in the connection set up, the type of connection; and
   checking for silence intervals only if a voice transmission link has been set up between the circuit-switched network and the packet transmission network.

17. An exchange unit, comprising:
   an access unit which signals in accordance with a protocol for circuit-switched data networks communicating to packet transmission networks;
   a control unit, coupled to the access unit, wherein said control unit determines types of user data that are transmitted between the circuit-switched data networks and the packet transmission networks and transmits the user data determined to be a normal operating mode; and
   an interworking unit, coupled to said control unit, wherein said interworking unit blocks transmission of user data from the circuit-switched data networks to the packet transmission networks when the user data is determined to be a silence interval.

* * * * *